United States Patent [19]

Hess et al.

[11] 4,185,295
[45] Jan. 22, 1980

[54] METHOD OF MIXING SECAM COLOR-T.V. SIGNALS

[75] Inventors: Heinz Hess, Weiterstadt; Michael Hausdörfer, Darmstadt, both of Fed. Rep. of Germany

[73] Assignee: Robert Bosch GmbH, Stuttgart, Fed. Rep. of Germany

[21] Appl. No.: 951,658

[22] Filed: Oct. 16, 1978

[30] Foreign Application Priority Data

Oct. 17, 1977 [DE] Fed. Rep. of Germany ....... 2746641

[51] Int. Cl.² ........................................... H04N 9/535
[52] U.S. Cl. .................................................... 358/22
[58] Field of Search ...................... 358/21, 22, 30, 23, 358/25

[56] References Cited

U.S. PATENT DOCUMENTS 3,296,367  1/1967  Cassagne et al. ...................... 358/22

Primary Examiner—John C. Martin
Attorney, Agent, or Firm—Michael J. Striker

[57] ABSTRACT

Each one of plural SECAM color-T.V. signals to be mixed is processed as follows: the signal is split into a luminance component and a video-frequency color component; the color component is amplitude-modulated onto a carrier, and the thusly modulated carrier is superimposed onto the respective luminance component to yield a frequency-multiplex signal which is then applied to one respective input channel of a mixer. The output signal of the mixer is split into a mixed luminance component and an amplitude-modulated mixed color component. The latter must be amplitude-demodulated, and then is frequency-modulated and superimposed onto the mixed luminance component to yield the desired mixed SECAM color-T.V. signal. Suppressed carrier amplitude-modulation is used, and each original video-frequency color component has superimposed, during the horizontal blanking intervals, reference oscillations from the carrier used for amplitude-modulation. The carrier signal needed by the amplitude-demodulator is derived from or furnished in dependence upon the amplitude of the reference oscillations in the horizontal blanking intervals of the amplitude-demodulated mixed color component, the reference oscillations having a phase which differs by 90° from the phase which the carrier signal used for amplitude-modulation has outside the horizontal blanking intervals.

26 Claims, 4 Drawing Figures

METHOD OF MIXING SECAM COLOR-T.V. SIGNALS

BACKGROUND OF THE INVENTION

The present invention is an improvement upon the method and system disclosed in commonly owned copending patent application Ser. No. 863,303 filed Dec. 22, 1977 entitled "MIXING OF SECAM COLOR-T.V. SIGNALS," the entire disclosure of which is incorporated herein by reference.

The method and system of that application relate to the mixing of SECAM color-T.V. signals. The mixing method of that application is briefly reviewed here as follows: A plurality of original SECAM color-T.V. signals are to be mixed. Prior to mixing, each original SECAM color-T.V. signal is split into its luminance component and its color component. The color component is then frequency-demodulated, to yield a video-frequency color signal. The color signal has the form of two color-difference signals, time-division-multiplexed in alternate respective horizontal line intervals, i.e., the first color-difference signal during the first horizontal line interval, the second color-difference signal during the second horizontal line interval, the first color-difference signal again during the third horizontal line interval, and so forth. This color signal, comprised of two time-division-multiplexed color-difference signals, is then used to amplitude-modulate a carrier, and the thusly amplitude-modulated carrier is superimposed upon the associated luminance signal component, to form a frequency multiplex of the luminance and color signals. Such a frequency multiplex is formed from each one of the original SECAM color-T.V. signals to be mixed. Each such frequency multiplex is fed to a mixer via a single respective channel; the mixer is accordingly classified as a one-channel mixer, in the sense that each original signal need not be furnished using two input channels. The output signal of the mixer is then frequency-separated into a mixed luminance component and a mixed color component, the latter still being in amplitude-modulated form. The amplitude-modulated mixed color component is then amplitude-demodulated, to yield a video-frequency mixed color signal in which a first mixed color-difference signal and a second mixed color-difference signal are time-division-multiplexed in alternate respective horizontal line intervals. The mixed color signal is then used to frequency-modulate a carrier and the thusly modulated carrier is then superimposed upon the mixed luminance signal in accordance with SECAM standards, to yield the mixed SECAM color-T.V. signal desired.

With the mixing technique disclosed in that application, the carrier used for the suppressed-carrier amplitude-modulation of the individual original color signals must be fed to the synchronous amplitude-demodulator employed to amplitude-demodulate the mixed color signal at the output of the mixer. The carrier is for example fed to the synchronous amplitude-demodulator via a cable. Due to differing cable lengths feeding to the mixer, differences in the circuit stages within the mixer, and/or due to differing phase settings in the amplitude modulators and in the synchronous demodulator, and other causes, a phase error develops as between the pre- and post-mixed color-difference signals or, equivalently, the carrier before and after the mixing. In order to eliminate these phase errors, adjustable-phase stages can be inserted between the individual amplitude-modulators and the synchronous demodulator, in order to be able to adjust phase until the phase errors disappear. However, making such phase adjustments is complicated by the unavailability of suitable vectorscopes for processing the carrier frequencies used in this mixing technique. Also, even if a successful phase adjustment is achieved, it is necessary thereafter to continuously monitor for renewed development of such phase errors and then to adjust phase once again until such phase errors are again eliminated.

SUMMARY OF THE INVENTION

It is the main object of the present invention to provide a mixing technique of the type in question, but in which the phase of the carrier used for amplitude-demodulation is properly adjusted by automatic means.

In accordance with the present invention, each original color signal is suppressed-carrier amplitude-modulated, and has superimposed onto it, during the horizontal blanking intervals, oscillations from the carrier used to perform this amplitude-modulation. Then, after the mixing, the suppressed carrier is regenerated in dependence upon the carrier oscillations present in the horizontal blanking intervals, and the regenerated carrier is fed to the synchronous demodulator used to amplitude-demodulate the mixed color signal.

The transmission of carrier oscillations during the horizontal blanking intervals makes it possible to utilize automatic means to adjust phase and eliminate the phase errors in question.

Also, it becomes unnecessary to feed the carrier from the amplitude-modulators to the synchronous demodulator at the output of the mixer, so that the shielded cable normally used for this purpose can be dispensed with.

Most importantly, because the phase adjustment is automatic, it is not necessary to initially adjust phase manually, nor is it necessary to thereafter continually monitor the phase situation for possible updating.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF THE PREFERRED EMBODIMENTS

The present invention is an improvement upon the one-channel mixing technique disclosed in the copending commonly owned application identified above, the entire disclosure of which is incorporated herein by reference. In that application, each original SECAM color-T.V. signal to be mixed is first split into its luminance component and its color component. In accordance with SECAM standards, the color component comprises two color-difference signals $D'_R$ and $D'_B$ which are time-division-multiplexed in respective alternate horizontal line intervals, i.e., $D'_R$ in one horizontal line interval, $D'_B$ in the next horizontal line interval, $D'_R$ again in the subsequent horizontal line interval, and so forth. Each such original color signal is amplitude-modulated onto a carrier whose frequency exceeds the upper limit of the frequency spectrum of the luminance component (greater than 5 MHz). The thusly amplitude-modulated signal is then superimposed onto the associated luminance signal, to yield a frequency multiplex which is then fed via a single channel to one input of the mixer. This is done for each one of the original SECAM color-T.V. signals to be mixed. After the mixing, the mixed color signal is frequency-separated from the mixed luminance signal, and the mixed color signal is then amplitude-demodulated to yield a video-frequency mixed color signal comprising two time-division-multiplexed color-difference signals. The video-frequency mixed color signal is then frequency-modulated onto a carrier in accordance with SECAM standards, and the thusly modulated carrier is superimposed onto the mixed luminance signal, to yield the mixed SECAM color-T.V. signal desired.

Figure 1:
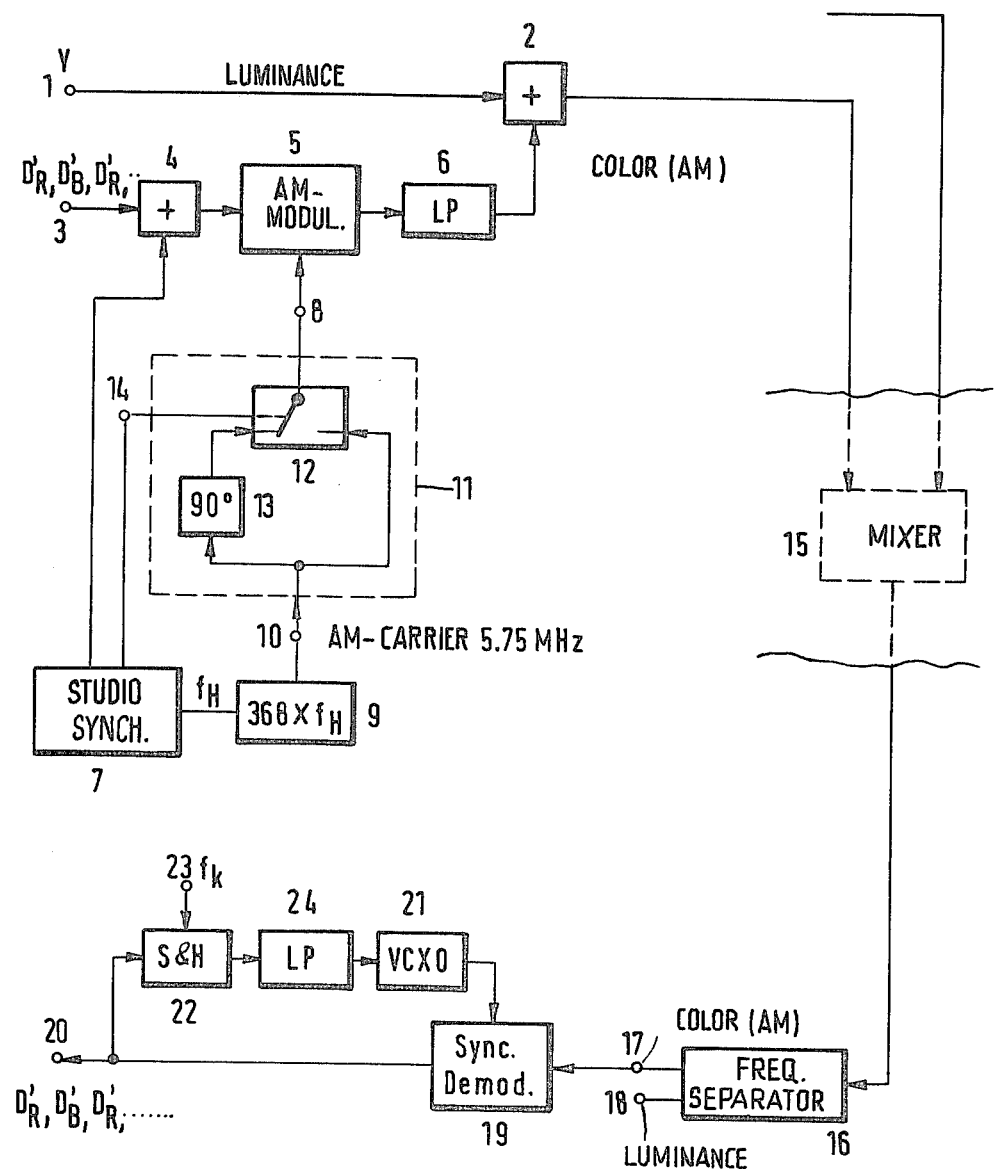
FIG. 1 is a schematic block diagram illustrating the technique of the present invention.

In FIG. 1 of the present drawing, it is mainly the amplitude-modulation and amplitude-demodulation of the original and mixed color signals which is illustrated, for the sake of simplicity. Background details can be had from the copending application identified above. It is assumed, for simplicity, that each original SECAM color-T.V. signal has already been split into its luminance component Y and into its color component $D'_R$, $D'_B$, $D'_R$ . . . , and furthermore it is assumed that the color component has already been frequency-demodulated.

The luminance component Y of one of the original SECAM color-T.V. signals to be mixed is applied at a terminal 1 to an adding stage 2. The video-frequency color component of that color-T.V. signal, comprised of two color-difference signals $D'_R$ and $D'_B$ time-division-multiplexed in respective alternate horizontal line intervals, is applied at a terminal 3, via an adding stage 4, an amplitude-modulator 5 and a low-pass filter 6, to a second input of adding stage 2. Reference pulses are superimposed onto the color signal, in the adding stage 4, during the horizntal blanking intervals of the horizontal line intervals. These reference pulses are supplied, for example, by the studio synchronizer 7 of a television studio. The time-division-multiplexed color-difference signals, with the reference pulses superimposed in the horizontal blanking intervals, is amplitude-modulated in modulator stage 5 to yield a suppressed-carrier amplitude-modulated output signal. The carrier employed is furnished to modulator stage 5 at a terminal 8. The low-pass filter 6 limits the frequency of the amplitude-modulated color signal to 7 MHz.

In the explanatory example illustrated, it is to be assumed that the carrier applied to terminal 8 is derived from a horizontal synch signal $f_H$ furnished by the studio synchronizer 7. The derivation of the carrier is performed in a coupling stage 9, in which the carrier signal to appear at output terminal 10 is coupled to a signal having a frequency 368 times the horizontal line frequency $f_H$ with null-offset. The resulting 5.75 MHz carrier is applied to a phase-rotating stage 11, and is transmitted to terminal 8 after being subjected to a 90° phase rotation. In particular, it is the purpose of stage 11 to rotate the phase of the carrier at terminal 10 by 90° during horizontal blanking intervals. In the simplest case (a more sophisticated one is described below), the phase-rotating stage 11 comprises an electronic changeover switch 12. One input terminal of changeover switch 12 receives the carrier at terminal 10, whereas the other input terminal receives the carrier after the latter has been subjected to a 90° phase rotation in a stage 13. The setting of the two-setting changeover switch 12 is controlled by a control signal at terminal 14, furnished by the studio synchronizer 7. This control signal is applied during horizontal blanking intervals, and in response to such control signal changeover switch 12 assumes the setting illustrated, transmitting the signal at the output of phase-rotating element 13 to terminal 8. During the active horizontal line interval, i.e., the horizontal line interval exclusive of the horizontal blanking interval, changeover switch 12 assumes its other setting, connecting terminal 8 directly to input terminal 10.

The adding stage 2 superimposes the video-frequency luminance signal Y onto the thusly modulated color signal with superimposed reference pulses, to form a frequency multiplex which is applied to one input of a one-channel mixer 15. Mixer 15 can be referred to as a one-channel mixer, to emphasize that, for each one of the original color-T.V. signals to be mixed, only a single input line, not two, is required for the luminance and chrominance components of the signal. The other input(s) of mixer 15 receive the other original color-T.V. signals to be mixed, each one having been processed in the manner already described for the first.

The frequency multiplex developed at the output of mixer 15 is applied to a frequency separating stage 16, which splits it into a mixed luminance component and a mixed color component. In particular, an amplitude-modulated mixed color signal is furnished at terminal 17, and a video-frequency mixed luminance signal at terminal 18. The suppressed-carrier amplitude-modulated mixed color signal is demodulated in a synchronous demodulator 19, to furnish at terminal 20 a video-frequency mixed color signal comprised of the two time-division-multiplexed mixed color-difference signals $D'_R$ and $D'_B$. In order to perform a proper demodulation of the supressed-carrier amplitude-modulated signal, synchronous demodulator 19 must be supplied with a carrier signal coinciding in frequency and phase with the carrier signal furnished to amplitude modulator 5. To this end, the carrier needed for demodulation is supplied by a quartz oscillator 21 which is controllable in frequency and phase, the frequency of oscillator 21 being in the vicinity of the frequency of the carrier furnished by coupling stage 9. A phase-error-correction signal used to adjust the quartz oscillator 21 is derived by a sample-and-hold stage 22 from the synchronously demodulated signal at the output of demodulator 19. In particular, sample-and-hold stage 22 samples the amplitude of the amplitude-demodulated signal during the reference-pulse intervals, and each sampled amplitude value is stored for the duration of the next-following horizontal line interval. The times at which stage 22 samples are determined by a series of sampling pulses $f_K$. The sampling pulses $f_K$ can for example be furnished by the studio synchronizer 7. Each sample amplitude value is stored for one horizontal line interval and the stored signal, after passing through a low-pass filter 24, is applied to the controllable quartz oscillator 21 as a control signal.

Figure 2:
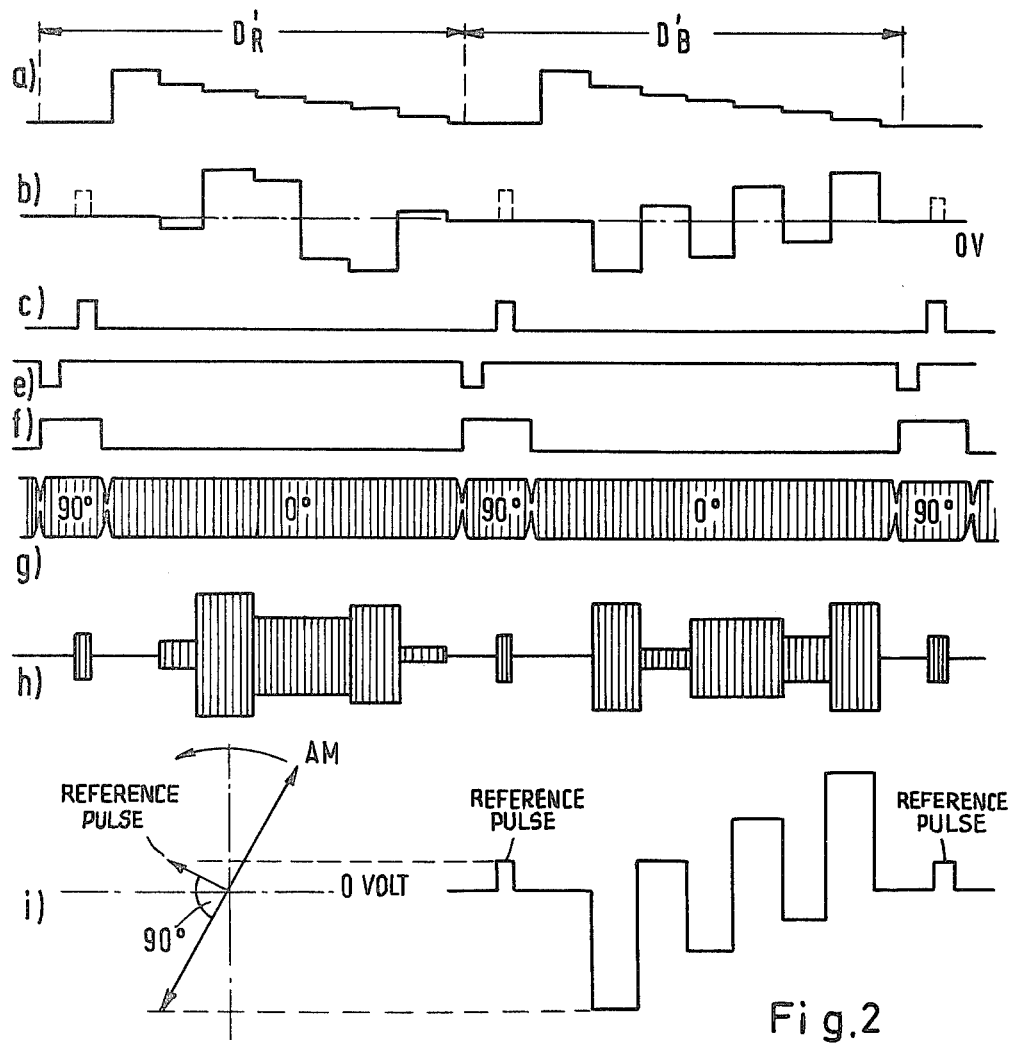
FIG. 2 depicts various signals, and is referred to below in the explanation of the operation of the embodiment depicted in FIG. 1.

The voltage versus time diagrams in FIG. 2 will facilitate understanding of the operation of the circuit of FIG. 1. For explanatory purposes, it is assumed that the one of the signals applied to mixer 15 corresponds to a color bar text pattern ordered with respect to brightness values. As already explained, the color and luminance components of such signal must be furnished separately.

FIG. 2a depicts the luminance component of the signal, the luminance component being of staircase form. This is the signal furnished at terminal 1.

FIG. 2b depicts the color component of the signal. This is the signal furnished at terminal 3. During the first horizontal line interval illustrated, the color signal comprises the color-difference signal $D'_R$, and during the second illustrated horizontal line interval the color signal comprises the color-difference signal $D'_B$, this being denoted one line above in FIG. 2a. In FIG. 2b, the aforementioned reference pulses in the horizontal blanking intervals are indicated by broken lines.

FIG. 2c depicts the reference pulses per se, i.e., as they are furnished to adding stage 4.

FIG. 2e depicts a horizontal-line-frequency pulse train, from which can be derived the control pulses to be applied to terminal 14. For example, the pulse train of FIG. 2e can be furnished by studio synchronizer 7 to the input of a monostable multivibrator, the output voltage of such monostable multivibrator being shown in FIG. 2f. The monostable multivibrator can be triggered by the negative-going flank of a pulse in FIG. 2e and remain in its unstable state for a time interval approximately equal to the horizontal blanking interval, as shown in FIG. 2f.

FIG. 2g depicts the carrier furnished to suppressed-carrier amplitude-modulator 5 at terminal 8. The phase of the carrier, during the horizontal blanking intervals, is shifted by 90° with respect to the phase the carrier has during the active portion of the horizontal line interval, as indicated in FIG. 2g by the designations "90°" and "0°".

FIG. 2h depicts the envelope of the signal produced at the output of suppressed-carrier amplitude-modulator 5. The video-frequency color-difference signals, with the reference pulses superimposed thereon in the horizontal blanking intervals, have been amplitude-modulated onto the carrier, and the carrier suppressed.

FIG. 2i, at the right thereof, depicts the synchronously demodulated video-frequency mixed color signal produced at the output of synchronous demodulator 19. Two reference pulses are shown, each in a horizontal blanking interval.

FIG. 2i, at the left thereof, depicts the corresponding vector diagram.

For the sake of explanation, consider a moment in time at which the automatic phase adjustment of quartz oscillator 21 has not yet been performed. The vector representing the demodulated reference pulse does not coincide with the abscissa of the diagram, because of a phase difference in the carrier.

Accordingly, the vectors representing the two color-difference signals, each phase-shifted by 90° relative to that representing the demodulated reference pulse, do not coincide with the ordinate. Clearly, the degree of the phase error of the carrier is reflected in the non-zero voltage amplitude of the demodulated reference pulse, and this amplitude value automatically adjusts the frequency or phase of controllable quartz oscillator 21 in a sense reducing the phase error. Accordingly, phase error is automatically and continually eliminated.

Figure 3:
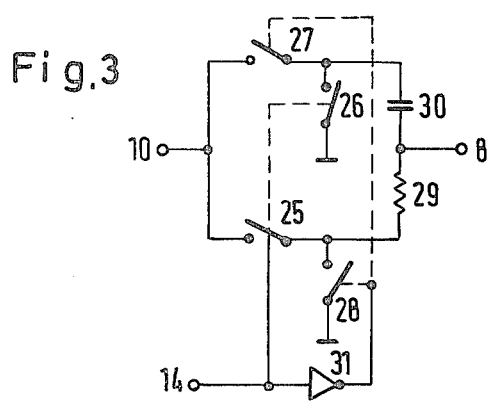
FIG. 3 depicts a preferred circuit for the unit 11 of FIG. 1.

FIG. 3 depicts a particularly preferred circuit for the 90° phase-rotating stage 11 of FIG. 1. The input and output terminals 14, 10 and 18 of stage 11 are indicated, for the sake of correlation. The circuit comprises four controllable electronic switches 25–28, a resistor 29 and a capacitor 30. When switches 25, 26 are closed and 27, 28 open, the input sinusoid at terminal 10 is applied across the series combination of resistor 29 and capacitor 30, but the output sinusoid at terminal 8 is taken from across the capacitor 30 of the series RC stage 29, 30. Conversely, when switches 25, 26 are open and 27, 28 closed, the input sinusoid at terminal 10 is once again applied across the series combination of resistor 29 and capacitor 30, but now the output sinusoid at terminal 8 is taken from across the resistor 29 of the series RC stage 29, 30. The conduction stages of all four electronic switches 25–28 are controlled by the control signal furnished at terminal 14. In order that switches 27, 28 open when switches 25, 26 close, and vice versa, an inverter 13 is provided to invert the control signal at terminal 14 prior to application to the control inputs of switches 27 and 28.

Figure 4:
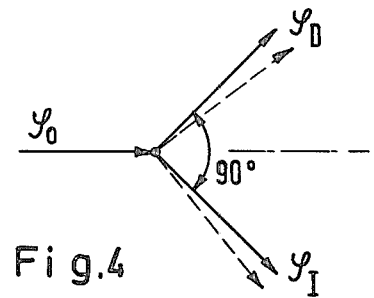
FIG. 4 is a vector diagram referred to in the explanation of the operation of the circuit shown in FIG. 3.

The 90° phase-rotating circuit shown in FIG. 3 is not affected by changes in frequency or in components, such as due to aging of the resistor 29 and capacitor 30. This feature will be explained with reference to the vector diagram of FIG. 4. Assume that the phase vector $\phi_o$ of the carrier sinusoid applied to input terminal 10 has the direction shown. The input sinsoid is, for both combinations of settings of the switches 25–28, applied across the series combination of resistor 29 and capacitor 30. Depending upon whether the output sinusoid at terminal 8 is taken from across resistor 29 or else from across capacitor 30, the phase vector $\phi_D$ or $\phi_I$ of the output sinusoid will be rotated relative to that of phase vector $\phi_o$ by an angle dependent upon the values of both resistor 29 and capacitor 30. However, the angular difference between the two phase vectors $\phi_D$ and $\phi_I$ will always be equal to 90°. Accordingly, the carrier signal furnished at output terminal 8 will have a phase which alternates between a first value and a second value differing by 90° from the first value. If one of the circuit elements 29, 30 changes in value, the 90° mutually phase-shifted vectors $\phi_D$ and $\phi_I$ merely rotate jointly, as indicated in FIG. 4 by broken lines, while remaining 90° mutually phase-shifted. Any errors which develop will reflect themselves merely in differences between the amplitudes of the $\phi_D$ and $\phi_I$ components. Furthermore, this 90° phase-splitting technique is effective over a large frequency range.

The present invention is by no means limited to the specific exemplary system and technique explained above, and be practiced by equivalent means familiar to persons skilled in the art. For example, in FIG. 1 the adding stage 4 can be eliminated, if the amplitude-modulator 5 is of twin push-pull modulator configuration. In that case, the video-frequency color-difference signal $D'_R$, $D'_B$, $D'_R$, ..., applied to terminal 3 can be transmitted directly to the input of the twin push-pull amplitude-modulator. In that event, the reference pulse would be applied to a further input of the twin push-pull amplitude-modulator, with the twin push-pull modulator then taking on the function performed by the omitted adding stage. Other such modifications and configurational rearrangements will be available to persons skilled in the art.

Also, the carrier signal oscillations transmitted during the horizontal blanking intervals can additionally be used for auxiliary purposes, e.g., for automatic regulation of the amplitude of the color signal in dependence upon the amplitude of the thusly transmitted carrier signal oscillations.

It will be understood that each of the elements described above, or two or more together, may also find a useful application in other types of system configurations and procedures differing from the types described above.

While the invention has been illustrated and described as embodied in a particular system configuration, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

We claim:

1. An improved method of mixing SECAM color-T.V. signals, the method being of the type comprising the steps of
    (a) separating each one of the original SECAM color-T.V. signals to be mixed into its respective luminance component and its respective color component, with the color component being frequency-demodulated and having the form of two video-frequency color-difference signals time-division-multiplexed in respective alternate horizontal line intervals,
    (b) amplitude-modulating the color component,
    (c) and superimposing the amplitude-modulated color component onto the respective luminance component to form a frequency-multiplexed signal;
    (d) transmitting the plural frequency-multiplexed signals, each corresponding to a respective one of the original SECAM color-T.V. signals to be mixed, to a mixer and producing a mixed frequency-multiplexed signal;
    (e) frequency-separating the mixed frequency-multiplexed signal to form a mixed luminance component and a mixed color component, the mixed color component being amplitude-modulated;
    (f) amplitude-demodulating the amplitude-modulated mixed color component, to obtain an amplitude-demodulated video-frequency mixed color component comprised of two video-frequency mixed color-difference signals time-division-multiplexed in respective alternate horizontal line intervals; and
    (g) frequency-modulating the amplitude-demodulated video-frequency mixed color component and superimposing the resultant frequency-modulated mixed color component onto the mixed luminance component in accordance with SECAM standards, to obtain the desired mixed SECAM color-T.V. signal;
    the improvement comprising
        in step (b) amplitude-modulating the color component with carrier suppression to form a suppressed-carrier amplitude-modulated color component,
        in step (b), during horizontal blanking intervals, superimposing on the amplitude-modulated color component reference oscillations of the carrier signal used for the amplitude-modulation,
        in step (f), performing the amplitude-demodulation of the suppressed-carrier amplitude-modulated mixed color component using a synchronous demodulator, and furnishing to the synchronous demodulator for the demodulation a carrier signal dependent upon the reference oscillations in the horizontal blanking intervals of the amplitude-demodulated mixed color component.

2. The method defined in claim 1, the superimposing of the reference oscillations comprising furnishing reference pulses during the horizontal blanking intervals and superimposing the reference oscillations in dependence upon the reference pulses.

3. The method defined in claim 2, the superimposing furthermore comprising superimposing the reference pulses onto the original video-frequency color component during horizontal blanking intervals and then amplitude-modulating the original video-frequency color component, whereby the reference oscillations result from amplitude-modulating the reference pulses onto the carrier used for the amplitude-modulation.

4. The method defined in claim 2, during the amplitude-modulation using for the carrier a carrier signal whose phase during the horizontal blanking intervals differs by 90° from the phase which the carrier signal has outside the horizontal blanking intervals.

5. The method defined in claim 3, during the amplitude-modulation using for the carrier a carrier signal whose phase during the horizontal blanking intervals differs by 90° from the phase which the carrier signal has outside the horizontal blanking intervals.

6. The method defined in claim 1, the reference oscillations during the horizontal blanking intervals having a phase which differs by 90° from the phase which the carrier signal used for the amplitude-modulation has outside the horizontal blanking intervals.

7. The method defined in claim 1, the furnishing of the carrier signal to the synchronous demodulator comprising sampling the amplitude of the reference oscillations in the horizontal blanking intervals of the amplitude-demodulated mixed color component, storing each sampled amplitude value for the duration of a horizontal line interval, transmitting the sampled and stored amplitude value through a filter to the control input of a controllable-frequency oscillator to control the frequency of the oscillator, and using the signal produced by the oscillator as the carrier signal furnished to the synchronous demodulator.

8. The method defined in claim 1, the carrier signal used for the amplitude-modulation of step (b) having a frequency coupled with null-offset to a multiple of the horizontal line frequency.

9. The method defined in claim 8, the multiple being 368 times the horizontal line frequency.

10. The method defined in claim 1, furthermore suppressing the reference oscillations during vertical blanking intervals.

11. The method defined in claim 1, furthermore using the reference oscillations in the horizontal blanking intervals to automatically regulate the amplitude of the color-difference signals.

12. The method defined in claim 6, forming the carrier signal used for the amplitude-modulation by applying a first carrier signal to two phase-shifting means alternately to produce second and third signals differing from each other in phase by 90° and also differing in phase from the first carrier signal, and using the second and third signals alternately as the carrier signal for the amplitude-modulation.

13. The method defined in claim 12, using one and the same capacitor means for both of the two phase-shifting means.

14. An improved system for mixing SECAM color-T.V. signals, the system being of the type comprising
   (a) means separating each one of the original SECAM color-T.V. signals to be mixed into its respective luminance component and its respective color component, with the color component being frequency-demodulated and having the form of two video-frequency color-difference signals time-division-multiplexed in respective alternate horizontal line intervals,
   (b) means amplitude-modulating the color component,
   (c) means superimposing the amplitude-modulated color component onto the respective luminance component to form a frequency-multiplexed signal;
   (d) mixing means receiving the plural frequency-multiplexed signals, each corresponding to a respective one of the original SECAM color-T.V. signals to be mixed, and forming a mixed frequency-multiplexed signal;
   (e) means frequency-separating the mixed frequency-multiplexed signal to form a mixed luminance component and a mixed color component, the mixed color component being amplitude-modulated;
   (f) means amplitude-demodulating the amplitude-modulated mixed color component, to obtain an amplitude-demodulated video-frequency mixed color component comprised of two video-frequency mixed color-difference signals time-division-multiplexed in respective alternate horizontal line intervals; and
   (g) means frequency-modulating the amplitude-demodulated video-frequency mixed color component and superimposing the resultant frequency-modulated mixed color component onto the mixed luminance component in accordance with SECAM standards, to obtain the desired mixed SECAM color-T.V. signal;
   the improvement wherein:
   the means at (b) comprises suppressed-carrier amplitude-modulating means forming a suppressed-carrier amplitude-modulated color component, and means providing the suppressed-carrier amplitude-modulated color component in the horizontal-blanking intervals thereof with superimposed reference oscillations of the carrier signal used for the amplitude-modulation;
   the means at (f) comprises a synchronous demodulator, and means furnishing to the synchronous demodulator for the demodulation a carrier signal dependent upon the reference oscillations in the horizontal blanking intervals of the amplitude-demodulated mixed color component.

15. The system defined in claim 14, the means providing the superimposed reference oscillations comprising means furnishing reference pulses during the horizontal blanking intervals and superimposing the reference oscillations in dependence upon the reference pulses.

16. The system defined in claim 14, the means providing the superimposed reference oscillations comprising means superimposing reference pulses onto the original video-frequency color component during horizontal blanking intervals and then amplitude-modulating the original video-frequency color component, whereby the reference oscillations result from amplitude-modulating the reference pulses onto the carrier used for the amplitude-modulation.

17. The system defined in claim 15, the amplitude-modulating means including means furnishing a carrier signal whose phase during the horizontal blanking intervals differs by 90° from the phase which the carrier signal has outside the horizontal blanking intervals.

18. The system defined in claim 16, the amplitude-modulating means including means furnishing a carrier signal whose phase during the horizontal blanking intervals differs by 90° from the phase which the carrier signal has outside the horizontal blanking intervals.

19. The system defined in claim 14, the means furnishing the superimposed reference oscillations furnishing reference oscillations whose phase differs by 90° from the phase which the carrier signal used for the amplitude-modulation has outside the horizontal blanking intervals.

20. The system defined in claim 14, the means furnishing the carrier signal to the synchronous demodulator comprising sample-and-hold means sampling the amplitude of the reference oscillations in the horizontal blanking intervals of the amplitude-demodulated mixed color component and storing the sampled amplitude value for the duration of a horizontal line interval, and a controllable-frequency oscillator receiving and controlled by the stored amplitude value.

21. The system defined in claim 20, furthermore including a low-pass filter, the controllable-frequency oscillator receiving the stored amplitude value from the sample-and-hold means through the intermediary of the filter.

22. The system defined in claim 14, the means at (b) including means furnishing a carrier signal having a frequency coupled with null-offset to a multiple of the horizontal line frequency.

23. The system defined in claim 22, the multiple being 368 times the horizontal line frequency.

24. The system defined in claim 14, the means at (b) including means furnishing a first carrier signal, two phase-shifting means receiving the first carrier signal and alternately producing second and third signals differing from each other in phase by 90° and also differing in phase from the first carrier signal, and means performing the amplitude-modulation with the second and third signals being alternately used as the carrier signal.

25. The system defined in claim 24, the two phase-shifting means comprising shared capacitor means.

26. The system defined in claim 14, the means furnishing the superimposed reference oscillations comprising means furnishing reference oscillations whose phase differs by 90° from the phase which the carrier signal used for the amplitude-modulation has outside the horizontal blanking intervals, the last-mentioned means comprising: first, second, third and fourth controllable switches, each having an input terminal and an output terminal, the input terminals of the first and second switches being connected to receive a first carrier signal, a resistor having one terminal connected to the output terminal of the first switch and the input terminal of the fourth switch, a capacitor having one terminal connected to the other terminal of the resistor and having another terminal connected to the output terminal of the second switch and the input terminal of the third switch, the output terminal of the third switch being connected to the output terminal of the fourth switch, and means for alternately rendering only the first and third switches conductive and only the second and fourth switches conductive, whereby to produce at the junction of the capacitor and resistor a carrier signal whose phase alternates between two values differing from each other by 90° and both different from the phase of the first carrier signal.

* * * * *